Sept. 15, 1964     T. M. PLACE, JR., ETAL     3,149,300
SEALED MINIATURE VARIABLE RESISTOR
Filed Sept. 18, 1962
FIG. 1
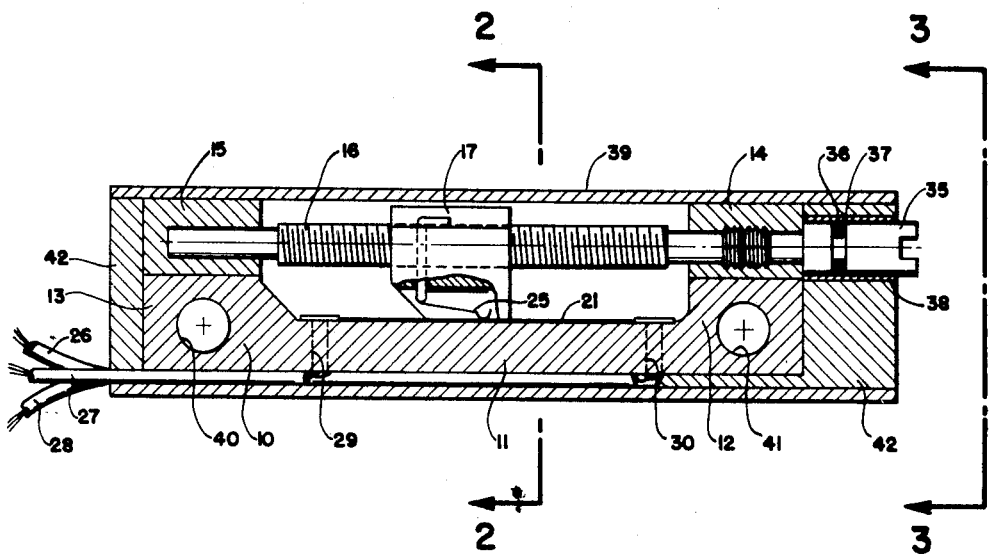
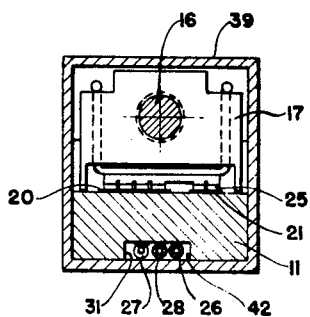
FIG. 2
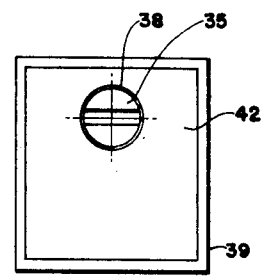
FIG. 3
INVENTORS
THOMAS M. PLACE, JR.
BY VIRGIL E. BRADFORD
*Louis J. Knobbe*
ATTORNEY

United States Patent Office 3,149,300
Patented Sept. 15, 1964

3,149,300
SEALED MINIATURE VARIABLE RESISTOR
Thomas M. Place, Jr., Costa Mesa, Calif., and Virgil E. Bradford, Joliet, Ill., assignors to Beckman Instruments, Inc., a corporation of California
Filed Sept. 18, 1962, Ser. No. 224,480
10 Claims. (Cl. 338—180)

This invention relates to a miniature variable resistance device and, more particularly, to rectilinear trimmer potentiometers which are sealed from the environment in which they operate.

The present state of the art relating to rectilinear trimmer potentiometers is highly developed as exemplified by the copending application of James F. Gordon, Serial No. 584,088, entitled "Potentiometer and Method of Manufacturing Same" filed May 10, 1956, and assigned to Beckman Instruments, Inc., assignee of the present invention. The trimmer potentiometers described in this application are completely satisfactory for most applications. Thus, they meet or exceed rigid military specifications prepared by the Armed Services Electro-Standards Agency. There are, however, extremely severe environmental conditions, e.g. extreme conditions of dust, dirt, fumes and moisture which may require additional sealing against environmental ingress.

Accordingly, it is the primary object of the present invention to provide a convenient and inexpensive means for sealing trimmer potentiometers against extremely severe environmental conditions.

One means for sealing a prior art trimmer potentiometer of the type shown in the copending Gordon application, supra, is that of encapsulating the potentiometer in a suitable sealing compound. Another means comprises hermetically sealing the potentiometer within a suitable container. However, these and other techniques have heretofore been unsatisfactory since the adjustment shaft must be accessible from outside of the sealed housing.

It is, therefore, another object of this invention to provide a means for effectively sealing a trimmer potentiometer while permitting complete access to the adjustment shaft.

A further object of this invention is to provide an improved variable resistance device which requires only minor changes in the prior art potentiometers for effectively sealing them against extreme environmental conditions.

Other and further objects, features and advantages of the invention will become apparent as the description proceeds.

Briefly, in accordance with a preferred form of the present invention, there is provided a rectilinear trimmer potentiometer having a support member upon which is mounted a resistance element. Means for movably contacting the resistance element include an adjustment shaft rotatably mounted upon the support member and having one end extending beyond one of the support member. An annular gland formed in the exposed end of the adjustment shaft retains a resilient O ring seal which engages the inner walls of a cylindrical member axially mounted upon the extending adjustment shaft. A sealing compound is then flowed between the outer surface of the cylindrical tubular member and inner walls of an extending housing encompassing the support member and overlapping at least a portion of the tubular member. In this manner, the adjustment shaft is completely sealed against environmental ingress. In addition, the sealing compound may be located between the outer housing and one or more additional walls of the support member so as to completely seal the potentiometer.

Trimmer potentiometers constructed in the manner just described are effectively sealed against environmental ingress while requiring only such minor changes of the prior art structure as extending the adjustment shaft beyond the end of the support member and providing same with an annular gland for supporting the O ring. Accordingly, a sealed potentiometer may be inexpensively constructed according to the teaching of this invention.

A more thorough understanding of the invention may be obtained by a study of the following detailed description taken in connection with the accompanying drawing in which:

FIG. 1 illustrates a longitudinal cross-section of a trimmer potentiometer constructed according to the present invention;

FIG. 2 is a cross-sectional view of the structure of FIG. 1 taken along the line 2—2; and FIG. 3 is an end view of the potentiometer shown in FIG. 1.

Referring now to the FIGS. 1, 2 and 3, there is shown a trimmer potentiometer having a support member 10 comprising a central portion 11 and upstanding end portions 12 and 13. Bearings 14 and 15 mounted in the end portions 12 and 13 respectively, rotatably support helically threaded adjustment shaft 16. A movable contact block 17 is engaged by the adjustment shaft and is adapted to be translated along the central portion 11 of the body between the end portions 12 and 13 upon rotation of shaft 16.

An elongated resistance element 20 and an elongated electrical conducting element 21 are mounted side by side on the central portion 11 of the support member 10. The support member 10 is preferably molded or cast from a single piece of electrical insulating material, a ceramic such as steatite being a highly suitable material. The resistance element 20 may be a wire wound resistor, a molded resistor, a deposited layer resistor, or any other suitable type. A deposited layer type of resistance element which is fired on a ceramic base is especially well adapted for use in the embodiment shown. Preferred deposited layer resistance elements comprise cermet resistance elements constructed according to the teachings of U.S. Patent No. 2,950,995, Tom Place, Sr., et al., and No. 2,950,996, Tom Place, Sr., et al. both of which are assigned to Beckman Instruments, Inc. Similarly, the electrical conducting element 21 may take various known forms, a film of silver fired on ceramic being preferred.

Electrical contact means 25 are carried on the contact block 17 for electrically connecting a point on the resistance element 20 with the conducting element 21. Connections are provided for coupling the resistance and conducting elements of the potentiometer to electrical leads 26, 27 and 28 extending through a channel 31 to the outside of the potentiometer. As shown, such connections may include connecting pins 29, 30 connected to respectively opposite ends of the resistance element 20 and a connecting pin (not shown) connected to the conducting element. The ends of these pins are connected to respective ends of the output leads 26, 27 and 28.

The foregoing described structure, including additional specific details thereof is described and claimed in the copending application of James F. Gordon entitled "Potentiometer and Method of Manufacturing Same," supra. It will also be apparent that other types of trimmer potentiometers known in the art may be effectively sealed against environmental ingress by the addition of the structure hereinafter described.

A primary consideration in sealing a shaft actuated potentiometer is in preventing ingress of environmental elements through the bearing through which the adjustment shaft extends to the outside of the potentiometer. In the present invention, the shaft 16 extends completely through the upstanding end portion 12 and includes an extension 35 extending outwardly from the front face of the end portion 12. This extension includes an annular gland 36 in which is retained a resilient O ring seal 37. Encompassing the extension 35 and coaxial therewith is a cylindrical member 38, preferably a thin wall metallic tube, whose inner surface is engaged by the O ring 37, the O ring being sufficiently compressed and deformed by the tube 38 so as to provide an effective seal. The O ring then equalizes the space between the tube 38 and the shaft extension 35. The length of the tubular member is such that when one end is forced into abutment with the front surface of the end portion 12, the outer end will be substantially flush with the front end of the potentiometer housing 39.

Potentiometer housing 39 may be a generally rectangular structure having a cross-sectional shape substantially corresponding to that of the ends 12 and 13 of the support member. As shown, the housing extends beyond both ends of the support member 10. This housing may be affixed to the support member 10 by means of eyelets (not shown) inserted through mounting holes 40, 41 provided in the potentiometer support member and housing.

The potentiometer construction is completed by filling the voids formed where the housing 39 overlaps the ends of the support member 10 with a sealing compound 42 selected preferably from one of the epoxy formulations with 100% solid resin content and afterwards cured. This material is dimensionally stable with substantially no shrinkage upon curing thereby providing a tight seal with the housing 39. Also, the epoxy may be filled with a material such as asbestos, silica or mica, or left unfilled as required for matching the thermal coefficient of expansions of the sealing compound and the housing so as to prevent movement of one relative to another when the resistance element is used in low or high temperature environments. The base channel 31 is also filled with the sealing compound. Certain insulative coverings for the flexible leads 26, 27 and 28 lend themselves for effectively sealing the space between the housing and the support member. Thus, the use of treated polytetrafluoroethylene as the insulating cover for these leads assures an effective bond between the sealing compound 42 and the leads. In the front of the potentiometer, the sealing compound 42 prevents the tubular cylinder 37 from rotating when the adjustment shaft 16 is actuated. An effective rotary O ring seal is thereby accomplished.

It may be noted that the specific materials utilized in the construction of the potentiometer will be primarily dictated by the temperature requirements of the potentiometer. By way of example, the O ring 37 may be molded from a synthetic rubber such as buna N for temperatures of less than 100° C. whereas silicone rubber compounds are available for use at temperatures exceeding 200° C.

Although exemplary embodiments have been disclosed and discussed, it will be understood that other applications of the invention are possible and that the embodiments disclosed may be subjected to various changes, modifications and substitutions without necessarily departing from the spirit of the invention.

We claim:
1. A variable resistor comprising:
a support member having a central portion and upstanding end portions;
a resistance element mounted upon said central portion;
an adjustment shaft journaled in bearings mounted in said end portions and having a helically threaded portion between said end portions of the support member;
a contact block carrying an electrical contact in engagement with said resistance element engaged by the threads of said adjustment shaft;
one end of said adjustment shaft extending completely through one of said upstanding members;
an annular gland formed in said one end of the adjustment shaft;
a resilient O ring seal retained in said gland;
a cylinder mounted over said one end of the adjustment shaft with its inner wall engaged by said O ring;
a housing encompassing said support member and having a cross-sectional shape substantially corresponding to that of said upstanding ends, said housing extending beyond the upstanding end through which the adjustment shaft extends and overlapping at least a portion of said cylinder; and
a sealing compound flowed between the outer surface of said cylinder and the inner surface of said extending housing.

2. A variable resistor comprising:
a support member;
a resistance element mounted to said support member;
a conductive element mounted to said support member;
electrical contact means mounted upon said support member movably contacting said resistance element and said conductive element, said means including an adjustment shaft rotatably mounted upon said support member and having one end outwardly extending beyond an end wall thereof;
an annular gland formed in said one end of the adjustment shaft;
a resilient O ring seal retained in said gland;
a thin wall metallic tube mounted over said one end of the adjustment shaft with its inner wall compressing the O ring seal thereby equalizing the space between the tube and the shaft;
a housing encompassing said support member and having an open end extending outwardly beyond said one end wall and overlapping at least a portion of said tube; and
a sealing compound flowed between the outer surface of said tube and the inner surface of the extending end of said housing.

3. The variable resistor defined in claim 2 wherein the outer end of said tube and the outer end of said housing lie in a common plane,
said plane also defining the outer surface of said sealing compound.

4. A variable resistor comprising:
a support member;
a resistance element mounted upon said support member;
electrical contact means mounted upon said support member movably contacting said resistance element, said means including an adjustment shaft rotatably mounted upon said support member and having one end extending completely therethrough;
an annular gland formed in said one end of the adjustment shaft;
a resilient O ring seal retained in said gland;
a member having a cylindrical opening mounted over said one end of the adjustment shaft with said cylindrical opening engaged by said O ring;
a housing encompassing said support member and having an open end extending beyond the end of the support member through which extends said adjustment shaft so that said extending portion of said housing overlaps at least a portion of said member having a cylindrical opening; and
a sealing material flowed between the outer surface of the member having a cylindrical opening and the inner surface of the extending end of said housing.

5. The variable resistor defined in claim 4 wherein said sealing material is dimensionally stable.

6. The variable resistor defined in claim 4 wherein said sealing material and said housing have substantially equivalent thermal coefficients of expansion.

7. The variable resistor defined in claim 4 wherein said sealing material is an epoxy formulation with substantially 100% solid resin content.

8. The variable resistor defined in claim 4 wherein said O ring is molded from a synthetic rubber.

9. The variable resistor defined in claim 4 wherein said O ring is molded from a silicone rubber compound.

10. The variable resistor defined in claim 4 wherein said housing includes an additional open end which extends beyond the opposite end of said support member, said additional open end being filled with a sealing material.

References Cited in the file of this patent

UNITED STATES PATENTS

| | | |
|---|---|---|
| 2,814,703 | Martin | Nov. 26, 1957 |
| 2,874,253 | Sharp et al. | Feb. 17, 1959 |
| 3,018,459 | Hardison et al. | Jan. 23, 1962 |
| 3,089,110 | Bourns et al. | May 7, 1963 |
| 3,090,025 | Dole | May 14, 1963 |

OTHER REFERENCES

Gordon, German Application 1,104,593 (KL, 21C 54/03), printed April 13, 1961.